(12) United States Patent
Brukner et al.

(10) Patent No.: US 12,334,117 B2
(45) Date of Patent: Jun. 17, 2025

(54) CLOUD-CONNECTED DASH CAMERA WITH CONTINUOUS RECORDING CAPABILITY

(71) Applicant: IT US ACQUISITION CO, LLC, St. Louis, MO (US)

(72) Inventors: Matthias Brukner, Meine (DE); Max Hillman, St. Louis, MO (US); Kai-Uwe Bloem, Braunschweig (DE); Marcus Herzig, Winsen/Aller (DE); Scott Humphrey, Godstone (GB); Blake Loomis, Spring Hill, TN (US)

(73) Assignee: IT US ACQUISITION COMPANY, LLC, St. Louis, MO (US)

( * ) Notice: Subject to any disclaimer, the term of this patent is extended or adjusted under 35 U.S.C. 154(b) by 32 days.

(21) Appl. No.: 18/479,481

(22) Filed: Oct. 2, 2023

(65) Prior Publication Data
US 2024/0112705 A1    Apr. 4, 2024

Related U.S. Application Data

(60) Provisional application No. 63/412,392, filed on Oct. 1, 2022.

(51) Int. Cl.
*G11B 27/34* (2006.01)
*G11B 27/00* (2006.01)
*G11B 27/10* (2006.01)
*H04N 5/77* (2006.01)
*H04N 5/92* (2006.01)
*H04N 23/661* (2023.01)

(52) U.S. Cl.
CPC ............ *G11B 27/34* (2013.01); *G11B 27/005* (2013.01); *G11B 27/102* (2013.01); *H04N 5/77* (2013.01); *H04N 5/9201* (2013.01); *H04N 23/661* (2023.01)

(58) Field of Classification Search
CPC ..... G11B 27/34; G11B 27/005; G11B 27/102; H04N 23/661; H04N 5/9201
See application file for complete search history.

(56) References Cited

U.S. PATENT DOCUMENTS

| | | | |
|---|---|---|---|
| 2003/0007668 A1* | 1/2003 | Kotake | G01C 21/26 382/113 |
| 2015/0310895 A1* | 10/2015 | Shen | G11B 27/34 386/241 |
| 2020/0309541 A1* | 10/2020 | Lavy | G06V 20/588 |

FOREIGN PATENT DOCUMENTS

| | | |
|---|---|---|
| KR | 1020090000107 A | 1/2009 |
| KR | 1020210051484 A | 5/2021 |
| WO | 2019236719 A1 | 12/2019 |

* cited by examiner

*Primary Examiner* — Girumsew Wendmagegn
(74) *Attorney, Agent, or Firm* — UB Greensfelder LLP; Benjamin D. Rotman

(57) ABSTRACT

The invention is directed to a cloud-connected dash camera ("dashcam") system with continuous recording capability. The dashcam system is configured to record video segments in sync with GPS position data, upload the record video segments in sync with GPS position data to a backend server, and display the recorded video segments in sync with a GPS position on a map to an external computing device through a frontend graphical user interface.

17 Claims, 8 Drawing Sheets

Download/Stream the Requested Video

FIG. 6
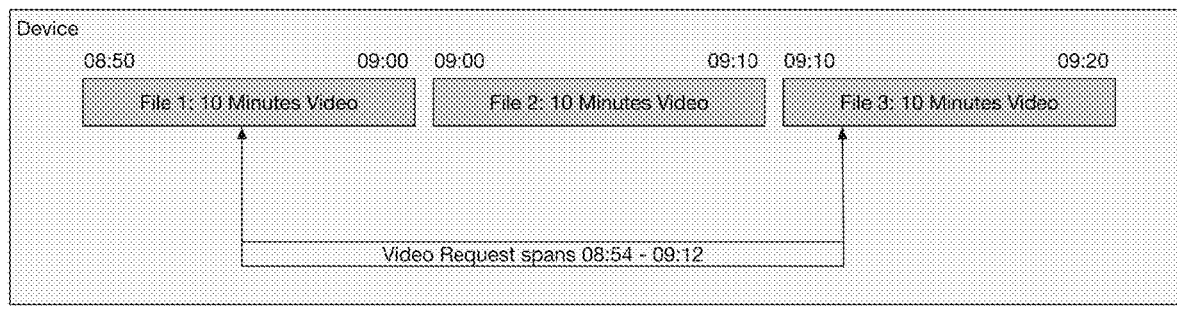
600. Identify video files to fulfill the Video Request
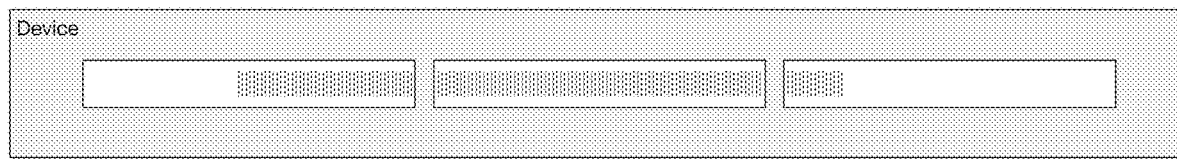
602. Extract required video and audio frames from the video files and transfer them to the server
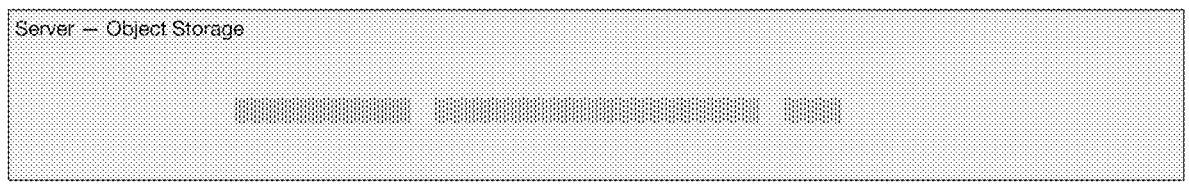
603. Store individual frames on the server
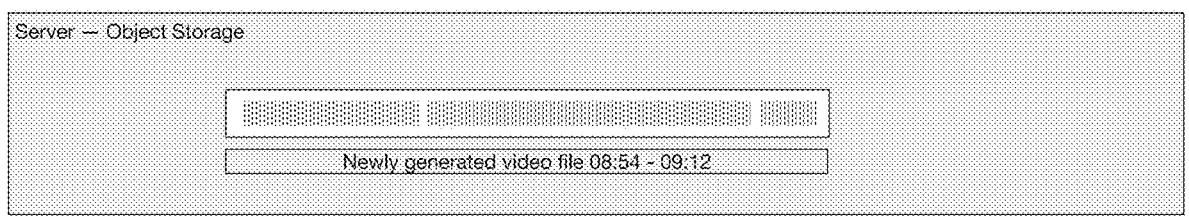
604. Reassemble audio and video frames to create a new video file

CLOUD-CONNECTED DASH CAMERA WITH CONTINUOUS RECORDING CAPABILITY

CROSS-REFERENCE TO RELATED APPLICATION

This application claims priority to U.S. Provisional Patent Application Ser. No. 63/412,392, filed Oct. 1, 2022, incorporated in its entirety herein.

BACKGROUND OF THE INVENTION

The present invention generally relates to the field vehicle mounted dashboard cameras. More particularly, the invention relates to a cloud-connected dashboard camera system configured to identify and review recorded video based on GPS location.

In the prior art, vehicle mounted dashboard cameras ("dashcams") operate to monitor and record both road conditions and vehicle cabin conditions. Monitoring and recording such conditions in the vehicle cabin can be done for the safety of the driver and passenger to ensure that each party is acting appropriately or monitoring and recording such conditions on the road outside the vehicle can be done to prove fault in an accident or report vandalism or property damage.

Some dashcams contain memory cards or memory chips allowing continuous recording of footage captured by the dash cam. In some dashcams, in order to retrieve the footage, users must remove the memory card or connect the camera to an external computing device such as a computer, tablet, or mobile phone. In other dashcam implementations, the dashcams may be paired with a mobile computing device or otherwise wirelessly connected to a cloud system. These cloud-connected dashcams allow users to remotely upload recorded footage from the dashcam, without physically interacting with the dashcam device or memory card. Cloud-connected systems allow the dashcam to stay in place for consistent recording and allows vehicle or fleet owners to remotely monitor drivers, passengers, and road conditions while preventing drivers and passengers from interfering with the video recordings.

While current dashcams can interact with cloud systems and cloud based graphical user interfaces, the ability to review videos at a later time in the cloud is typically limited to a time and date stamp making it difficult to always find the video frame that may be relevant to show a recorded action.

The present invention seeks to remedy the shortcomings of the prior art devices and systems by providing a cloud-connected dashcam system and feature set configured to retrieve recorded video by vehicle GPS positioning.

SUMMARY OF THE INVENTION

The present invention is generally directed to a cloud-connected dashboard camera system with continuous recording capability. The system comprises a dashcam communicatively coupled to a backend cloud server, the backend cloud server having a frontend graphical user interface ("GUI") accessible from an external computing device app, software, or web interface. The dashcam comprises an integrated or removable memory device, a means for wireless or external data communication, and the dashcam is communicatively coupled to a GPS positioning device.

The dashcam system in operation records the dashcam GPS position and GPS timestamp at said position, acquired from the GPS positioning device, in sync with recording the dashcam video and stores the GPS position and GPS timestamp along with the recorded video in a database on the dashcam memory. The dashcam system may continue to store the synced GPS and recorded video data, or upload the synced GPS and recorded video data to the backend cloud server through its means of wireless or external data communication. In some aspects, the synced GPS and recorded video data may be pulled from the dashcam memory device through a command made on the frontend GUI and in other aspects the dashcam itself may have a transmit data button that sends or instructs the dashcam to send the synced data to the backend server.

In another aspect of the system, the frontend GUI may display a recorded mapped out route formed from the GPS position data points, and through the GUI a user may select the map made up of GPS data points collected from the video recording data for a particular timeframe. The user may pinpoint particular GPS data points and call forth a preview of video collected in that GPS location range during that time, or call forth a full resolution video for review.

The present device and system comprise a series of features or software modules that allow users to remotely upload and display recorded video from a dashcam by requesting footage from a visual representation of the trip route. Additionally, in situations where the user has a general idea of when or where the footage of interest exists, but does not know the precise details of the time or location, the system comprises a feature for previewing longer segments of a trip to discover the precise location before requesting such footage using the methodology described above.

It is to be recognized by one of skill in the art that the terms "software," "app," "module," "routine," or "sub-routine" may be used interchangeably in this specification to describe a software or component parts thereof. In some embodiments of the present invention, each described module or routine/sub-routine is a component part of a larger set of software instructions while in other embodiments each described module or routine/sub-routine act as independent software applications. It is also to be recognized by one of skill in the art that the term "database" as used may describe a single specific database, or a sub-section of a larger database.

The methods, systems, apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

FIG. 6 is an illustration showing the analysis and synthesis of the video request; and, FIGS. 7-11 illustrate various aspects describing the present invention.

Other aspects and advantages of the present invention will become apparent upon consideration of the following detailed description, wherein similar structures have similar reference numerals.

DETAILED DESCRIPTION OF THE PREFERRED EMBODIMENTS

Figure 1:
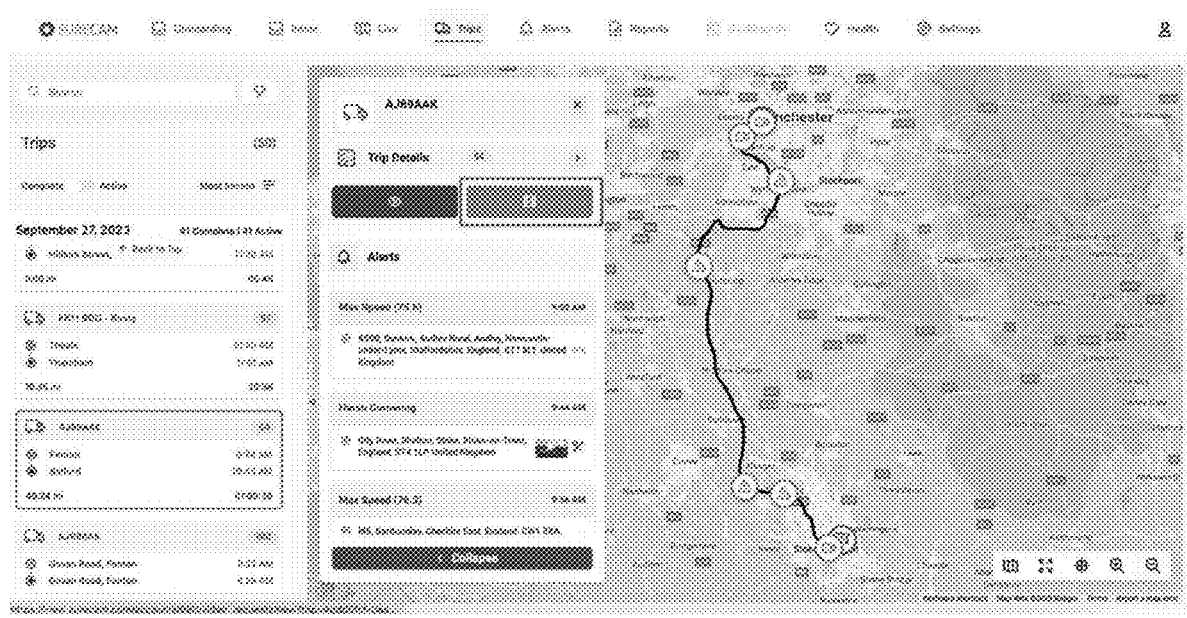
FIG. 1 is an example frontend GUI image illustrating that the user can select a location on the map or enter the timestamp to retrieve the recorded video of interest.

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

The system comprises a dashcam communicatively coupled to a backend cloud server, the backend cloud server having a frontend graphical user interface ("GUI") accessible from an external computing device app, software, or web interface.

The dashcam comprises a video capture device, such as a camera, memory, and a means for external data transmission. Further the camera is communicatively coupled to a GPS positioning device. One of skill in the art would recognize that the means for external data transmission may include but is not limited to a cellular radio, a Bluetooth radio, a Wi-Fi radio, an NFC radio, a LoRa radio, or similar industry standard radio, or an industry standard data port including but not limited to USB. Additionally, one of skill in the art would recognize that the means for external data transmission and the GPS positioning device may be chipsets integrated into the dashcam or external chipsets communicatively coupled to the dashcam.

The dashcam is further configured to record video and synchronize the video with GPS position and time data collected from the GPS positioning device. The dashcam is further configured to transmit the synchronized video to the backend server to be stored on the backend server wherein the synchronized video can be accessed through the frontend GUI.

The dashcam system in operation records the dashcam GPS position and GPS timestamp, acquired from the GPS positioning device, in sync with recording the dashcam video and stores the GPS position and GPS timestamp along with the recorded video in a database on the dashcam memory. The dashcam system may continue to store the synced GPS and recorded video data or upload the synced GPS and recorded video data to the backend cloud server through its means of wireless communication. In some aspects, the synced GPS and recorded video data may be pulled from the dashcam memory device through a command made on the frontend GUI and in other aspects the dashcam itself may have a transmit data button that sends or instructs the dashcam to send the synced data to the backend server.

In another aspect of the system, the frontend GUI may display a recorded mapped out route, and through the GUI a user may select a map made up of GPS data points collected in connection with video recording data for a particular timeframe. The user may pinpoint particular GPS data points and call forth a preview of video collected in that GPS location range during that time or call forth a full resolution video for review.

The frontend GUI further comprises additional software modules communicatively coupled to the backend server and or dashcam. In one aspect, Video Request is a software module communicatively coupled to the dashcam, the backend cloud server and the frontend GUI. In the Video Request module, a recorded video may be pulled and previewed through the frontend GUI by entering either a timestamp estimate or location estimate. The Video Request module pulls, uploads, and can display a predetermined preview segment of the recorded video associated with the timestamp or location data and can display the video through the frontend GUI. In some instances, this can be a predetermined segment spanning 30 to 60 seconds of footage, but can be longer or shorter depending on the user viewing requirements.

Figure 2:
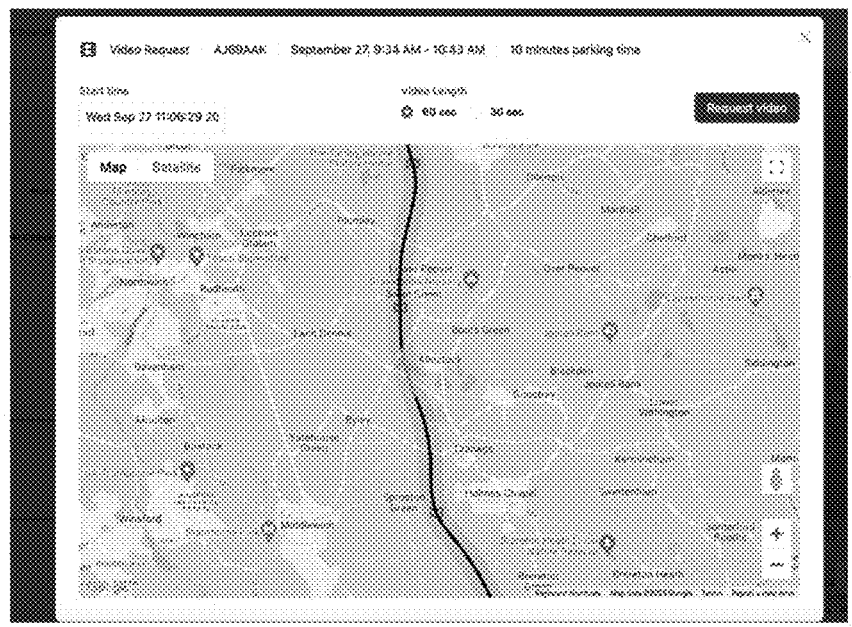
FIGS. 2-3 are example frontend GUI images illustrating the coloration of the trip in the frontend GUI is changed to visually represent the span of the trip for which footage is being requested and changed a second time when the choice is confirmed.
Figure 3:
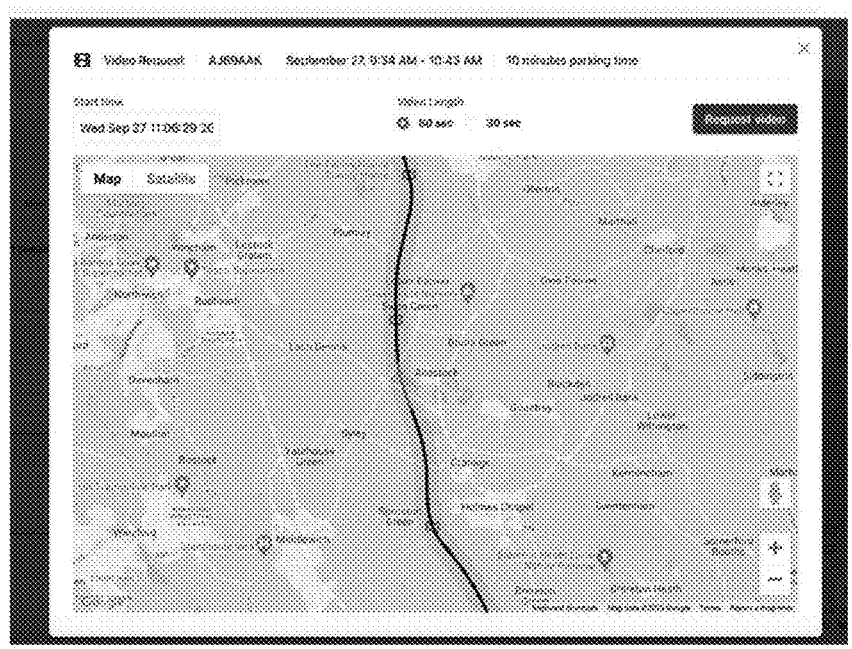

To make a Video Request, a user is presented with a visual representation of the trip of interest through the frontend GUI. A line or breadcrumb trail of the trip, as collected by the GPS positioning device, is displayed on the map. As shown in the example frontend GUI image of FIG. 1, the user can select a location on the map or enter the timestamp to retrieve the recorded video of interest. As shown in the example frontend GUI image of FIG. 2 and FIG. 3, the coloration of the trip in the frontend GUI is changed to visually represent the span of the trip for which footage is being requested and changed a second time when the choice is confirmed.

Figure 4:
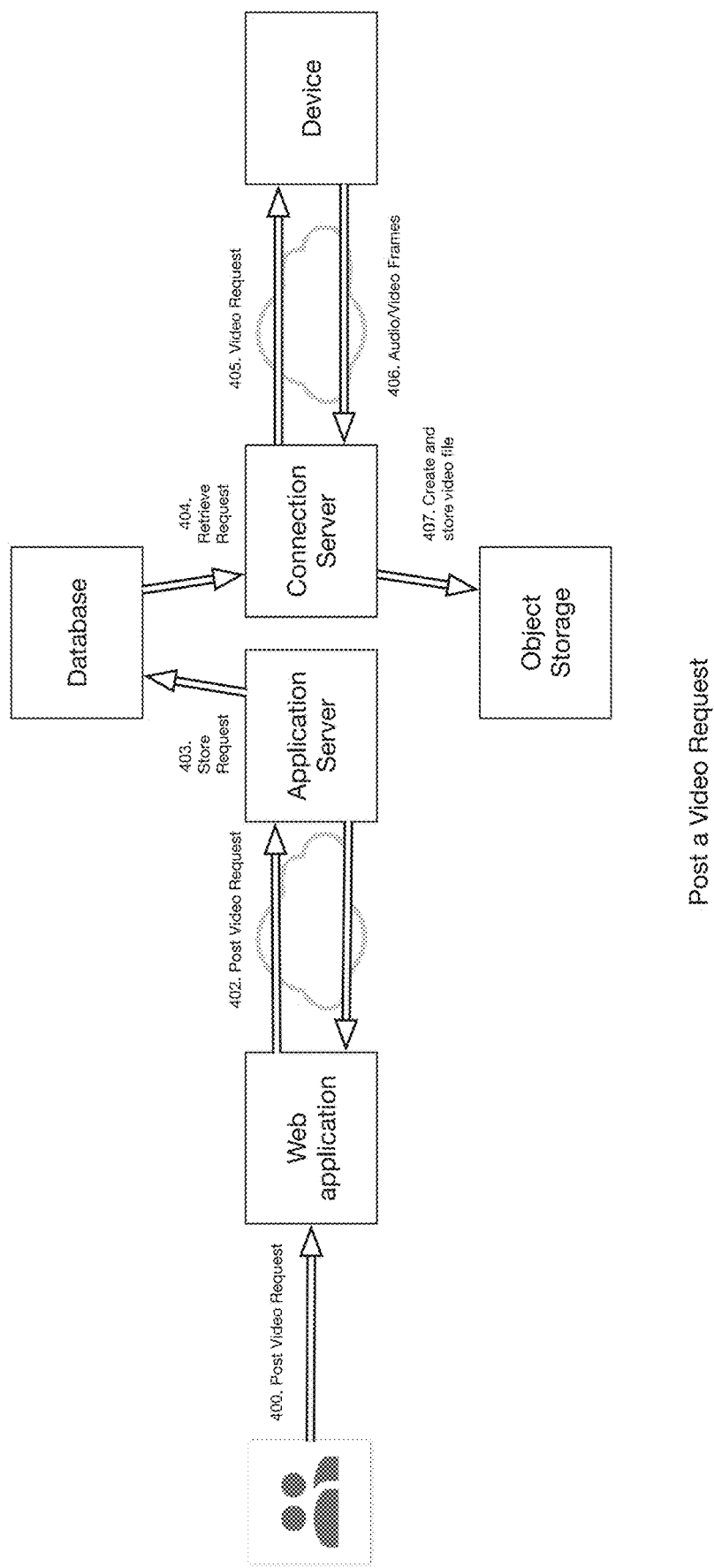
FIG. 4 is a flowchart illustrating the steps for posting a video request.

FIG. 4 is a flowchart representing the Video Request module process flow as described above in system terms to pull a video clip from the dashcam onto the backend server. As shown in FIG. 4, a post video request 400 is entered into the frontend GUI, the frontend GUI web application 402 transmits the post video request to the backend Application Server, the backend Application Server stores the request in a backend Application Server database 403, a retrieve request is made to the backend Connection Server 404, the backend Connection Server sends the video request to the dashcam device 405, the dashcam device retrieves the synchronized video from its memory, and transmits the synchronized video back to the backend Connection Server 406, which in turn creates and stores the synchronized video file on the backend server object storage 407.

Figure 5:
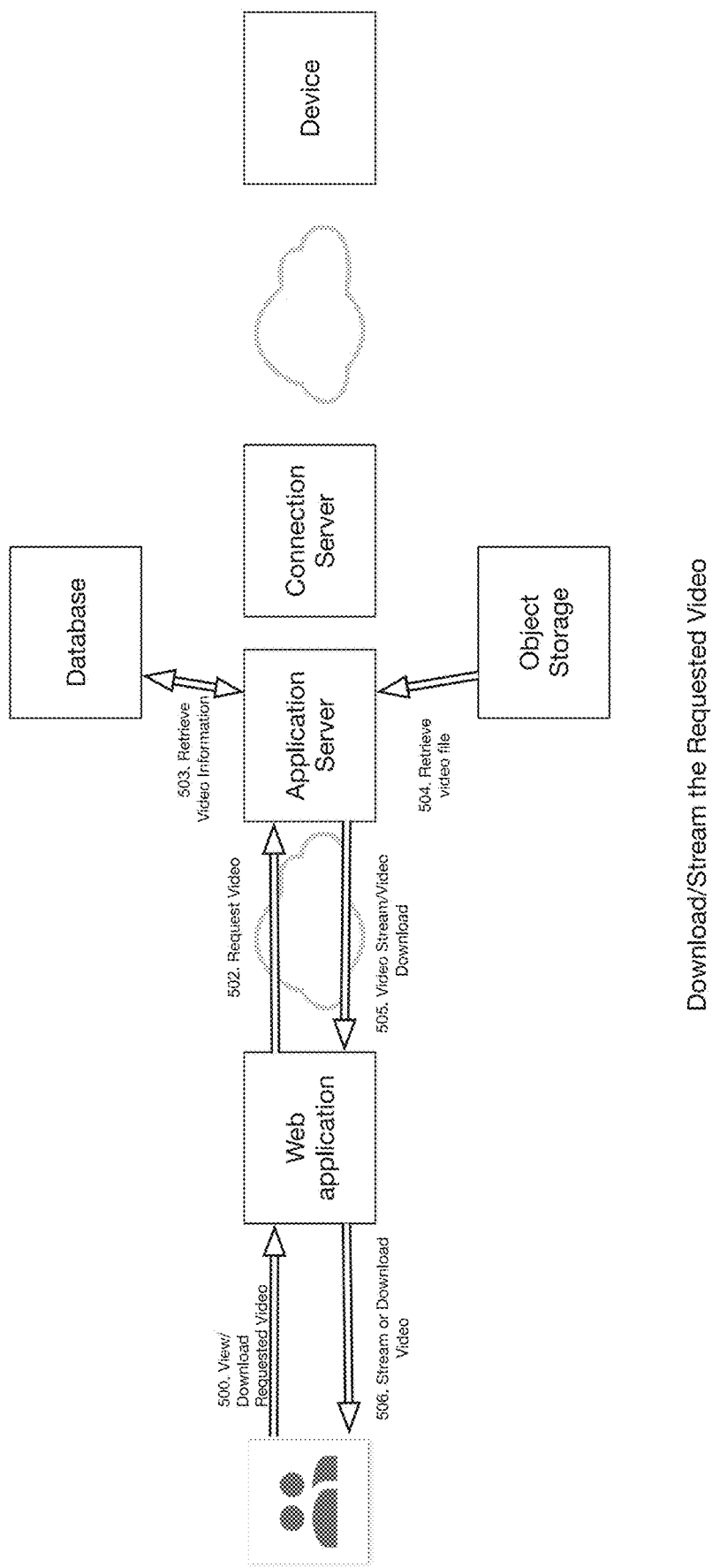
FIG. 5 is a flowchart illustrating the steps for downloading and streaming a requested video.

During the dashcam retrieval step 406, the dashcam inspects which locally stored video files are needed to fulfill the Video Request. It seeks the first frame of the first file and starts transmitting the video frame by frame to the server. The dashcam retrieval step 406 is further detailed in the process flowchart shown in FIG. 5. As shown in FIG. 5, the dashcam identifies the video files to fulfill the video request through timestamp or GPS data 500, the dashcam extracts the required video and audio frames from the video files and transfers the extracted video to the backend server 502. During the video storage step 407 and as further shown in FIG. 5, the server stores the individual frames in an object storage 503. After all frames have been successfully transferred the server generates and reassembles the audio and video frames to create a new video container file 504. In some aspects, the video file may be in an ISO/IEC 14496-12 compatible format, ready to be downloaded or streamed to the user. This newly generated file covers the requested time range.

FIG. 6 is a flowchart representing the Video Request module process flow as described above in system terms to download or stream the requested clip from the backend server. As shown in FIG. 6, a view/download requested video 600 is entered into the frontend GUI, the frontend GUI web application 602 transmits the video request to the backend Application Server, the backend Application Server retrieves the requested video data from the backend Application Server database 603, a retrieve video request is made to the backend Application Server Object Storage 604, and the backend Connection Server sends the video stream to the frontend Web Application 605, which in turn streams or downloads the video to an external computing device 606.

Figure 7:
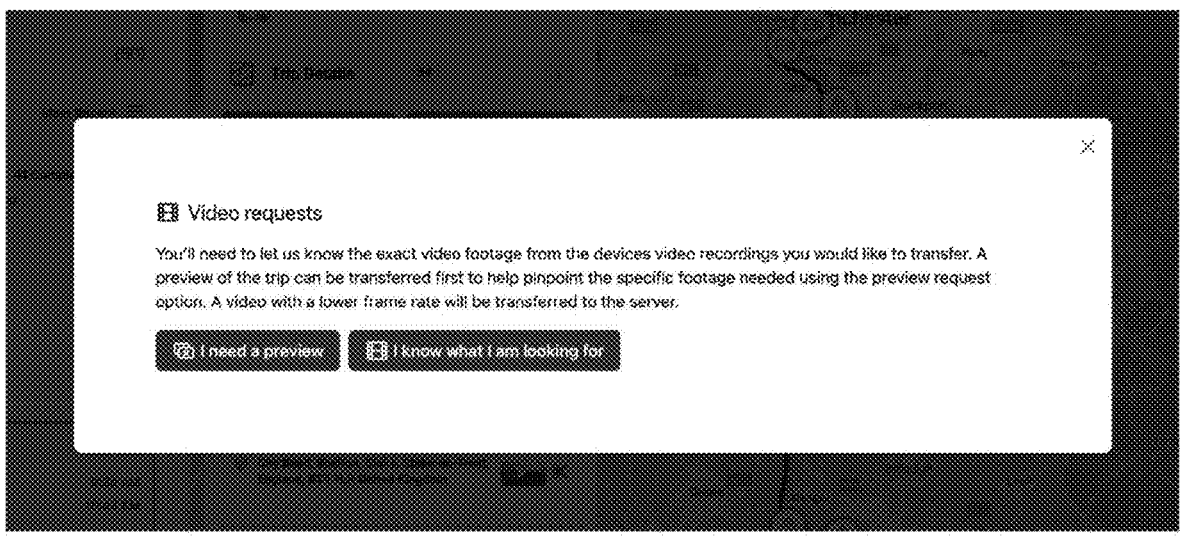
Figure 8:
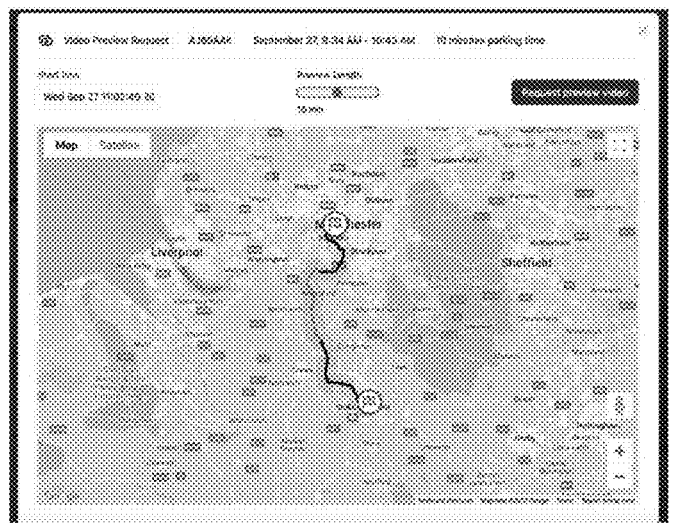
Figure 9:
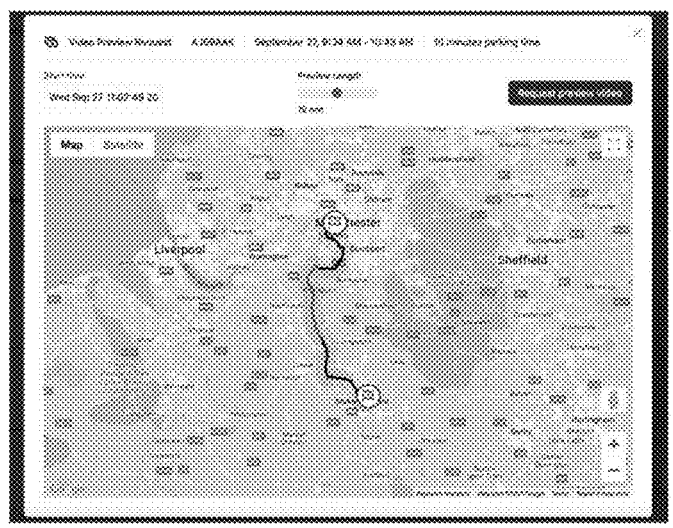
Figure 10:
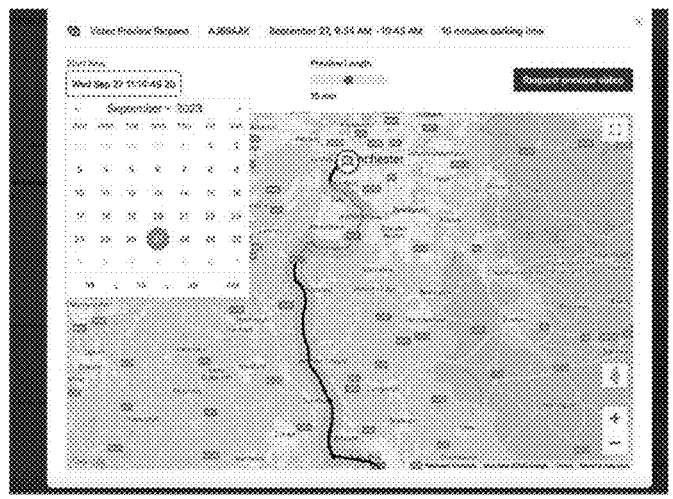

In another aspect Video Preview is a software module communicatively coupled to the dashcam, the backend cloud server, and frontend GUI. As shown in the example frontend GUI of FIG. 7, the frontend GUI offers the user the option for a Video Preview for a low frame full resolution video. In the Video Preview module, as shown in the example frontend GUI in FIGS. 8-10, a recorded video may be pulled and previewed through the frontend GUI by entering either a timestamp estimate or location estimate on the map. The Video Preview module pulls, uploads, and can display a predetermined or user set preview segment of the recorded video associated with the timestamp or location data and can display the video through the frontend GUI in similar processes as described above in FIGS. 4-6. However, the frame rate is lower than the full frame rate pulled in the Video Request module.

In a situation where the user knows the approximate location of the footage of interest, but requires further investigation before making a Video Request, the user would submit a Video Preview. In a Video Preview, the user is also presented with a visual representation of the trip of interest. However, the user can select a longer segment of the trip. The coloration of the trip will likewise be changed visually, in the graphical user interface, to represent the span of the trip for the Video Preview footage of interest as shown in example frontend GUI in FIGS. 8-10. Upon submitting the Video Preview, the device will receive a request from the server to remotely upload such footage to be displayed through the graphical user interface of a web application. The footage will be uploaded at a reduced frame rate (approximately one frame per 5 seconds by default), and full resolution. The reduced frame rate allows for a long segment of video to be uploaded without overburdening the device or monthly cellular data plan with excessive data consumption. The reduced frame rate allows for enough context to review longer segments of footage in a data efficient manner.

Figure 11:
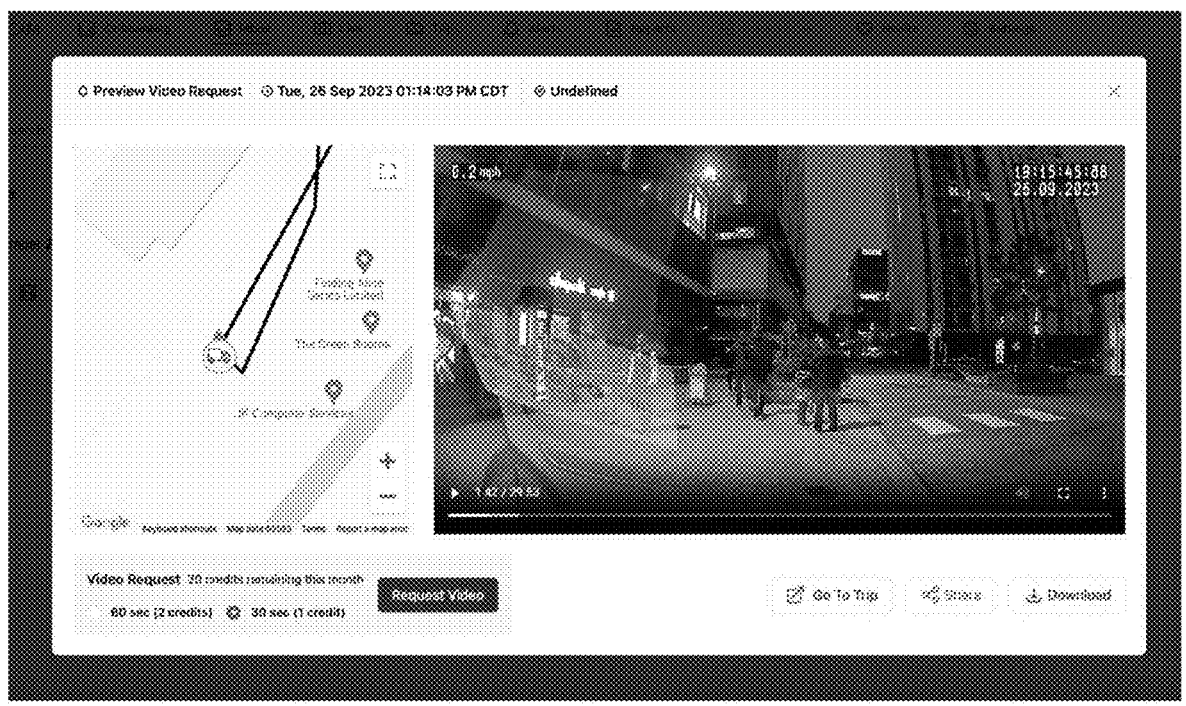

In one aspect of the system as shown in example frontend GUI in FIG. 11, after a Video Preview is uploaded to the web application, the user is presented with an interface that allows them to watch or scan frame-by-frame through the footage that has been uploaded. As the user scans through the footage, a corresponding map is also presented to the user with the precise location of the vehicle at the time of the video frame in view. Upon reaching the point in the footage where the user would like to upload additional footage, the user can make a Video Request, which will remotely upload full frame, full resolution video at the point of interest.

In another aspect of the system, after a video preview is uploaded, the low-frame, full-resolution video will be stored within the web application or backend server and available for the user to view. Through the frontend GUI, the user will be presented with a map, side-by-side the video frames that have been uploaded. As the user plays through or scrolls through the frames of the video, the frontend GUI updates the map to correspond with the GPS location of the frame the user is currently viewing. The user is able to visually relate video captured by the dashcam with GPS locations on the map to isolate the specific video footage they are searching for. From this location in the GUI, the user can select a pre-defined segment of video to request. The corresponding breadcrumb trail of the trip displayed on the map will change color to visually represent the segment of trip for which a full-frame, full resolution video will be uploaded.

In yet another aspect of the system, a method of use the system comprises the steps of communicatively coupling the dashcam with the backend server and the GPS positioning device; simultaneously recording a video segment and video segment timestamp data and collecting GPS position data and GPS position timestamp data and storing the video segment and video segment timestamp data and collecting GPS position data and GPS position timestamp data onto the dashcam memory; transmitting the video segment timestamp data, the GPS position data, and the GPS position timestamp data to the backend server; displaying the video segment timestamp data, the GPS position data, and the GPS position timestamp data in the form of a path on a map on the external computing device through the GUI communicatively coupled to the backend server; selecting a beginning portion of the path and an ending portion of the path through the GUI; the GUI retrieving a video segment correlating to the GPS position timestamp data of a beginning portion and ending portion of the selected path through the backend server through the dashcam; the dashcam transmitting the video segment correlating to the GPS position timestamp data of the beginning portion and ending portion of the selected path to the backend server; the backend server transmitting the video segment correlating to the GPS position times tamp data of a beginning portion and ending portion of the selected path to the GUI; and the GUI transmitting the video segment correlating to the GPS position timestamp data of the beginning portion and ending portion of the selected path to the external computing device. One of skill in the art would recognize that alternatively the dashcam may transmit the video segment and video segment timestamp data and collecting GPS position data and GPS position timestamp data to the backend server without a direct pull command from the frontend GUI.

Those of ordinary skill in the art will understand and appreciate the aforementioned description of the invention has been made with reference to certain exemplary embodiments of the invention, which describe a dashcam device and method of use. Those of skill in the art will understand that obvious variations in construction, material, dimensions, method steps or properties may be made without departing from the scope of the invention which is intended to be limited only by the claims appended hereto.

The invention claimed is:

1. A dashcam system comprising:
 a camera comprising a video capture device, memory, wherein the camera is communicatively coupled to a GPS positioning device and communicatively coupled to a backend cloud server;
 the backend cloud server including a software database and a frontend graphical user interface (GUI) communicatively coupled to the camera and an external computing device;
 wherein the camera is configured to record a video segment and collect GPS position data from the GPS positioning device, collect and synchronize a video segment timestamp and a GPS position data timestamp, and store a video segment synchronized with the GPS position data, video segment timestamp and a GPS position data timestamp in the memory or transmitted to the backend server;

further wherein the camera is configured to transmit the video segment timestamp and the GPS position data and GPS position data timestamp to the backend cloud server;

further wherein the GUI is configured to pull the video segment timestamp and the GPS position data and GPS position data from the backend server and display onto the external computing device a map with a path correlating to the GPS position data collected over the GPS position data timestamp;

further wherein a portion of the video segment is retrieved through the GUI and displayed on the external computing device by a user selecting at least a portion of the path correlating to the GPS position data collected over the GPS position data timestamp through the backend server through the camera; or wherein the video segment comprises a plurality of video frames, and each frame comprises a corresponding frame GPS position data point, wherein the GUI displays each video frame and displays each frame GPS position data point on the path concurrently such that as each video frame progresses to a subsequent video frame, each GPS position data point progresses to a subsequent position on the path and is moved along the path.

2. The dashcam system of claim 1 wherein the camera is communicatively coupled to the backend server through at least one of: a cellular radio, a Bluetooth radio, a Wi-Fi radio, an NFC radio, or a LoRa radio.

3. The dashcam system of claim 1 wherein the path changes from a first color to a second color as a portion of the path is selected.

4. The dashcam system of claim 1 wherein the portion of the video segment retrieved is a full frame, full resolution video over the selected path or over a selected time period.

5. The dashcam system of claim 1 wherein the portion of the video segment retrieved is a designated preview segment and is recompiled and displayed at a frame rate lower that an initial recorded frame rate.

6. A method of using the dashcam system of claim 1 comprising the steps of:
communicatively coupling the camera with the backend server and the GPS positioning device;
simultaneously recording a video segment and video segment timestamp data and collecting GPS position data and GPS position timestamp data and storing the video segment and video segment timestamp data and collecting GPS position data and GPS position timestamp data onto the memory;
transmitting the video segment timestamp data, the GPS position data, and the GPS position timestamp data to the backend server;
displaying the video segment timestamp data, the GPS position data, and the GPS position timestamp data in the form of a path on a map on the external computing device through the GUI communicatively coupled to the backend server;
playing the video segment and showing a progression of the each GPS position data point on the path concurrently with the progression of the video segment.

7. The method of using the dashcam system of claim 6 wherein the step of transmitting the video segment timestamp data, the GPS position data, and the GPS position timestamp data to the backend server further includes the step of transmitting the video segment timestamp data, the GPS position data, and the GPS position timestamp data to the backend server through the camera through at least one of: a cellular radio, a Bluetooth radio, a Wi-Fi radio, an NFC radio, or a LoRa radio.

8. The method of using the dashcam system of claim 6 further comprising the step of selecting a beginning portion of the path and an ending portion of the path through the GUI further includes the step of the GUI changing path color from a first color to a second color in between the beginning portion of the path and the ending portion of the path.

9. The method of using the dashcam system of claim 8 wherein the video segment retrieved is a full frame, full resolution video over the selected path or over a selected time period.

10. The method of using the dashcam system of claim 8 wherein the portion of the video segment retrieved is a designated preview segment and is recompiled and displayed at a frame rate lower that an initial recorded frame rate.

11. A dashcam system comprising:
a camera comprising a video capture device, memory, wherein the camera is communicatively coupled to a GPS positioning device and communicatively coupled to a backend cloud server;
the backend cloud server including a software database and a frontend graphical user interface (GUI) communicatively coupled to the camera and an external computing device;
wherein the camera is configured to record a video segment and collect GPS position data from the GPS positioning device, collect and synchronize a video segment timestamp and a GPS position data timestamp, and store a video segment synchronized with the GPS position data, video segment timestamp and a GPS position data timestamp in the memory or transmitted to the backend server;
further wherein the camera is configured to transmit the video segment timestamp and the GPS position data and GPS position data timestamp to the backend cloud server;
further wherein the GUI is configured to pull the video segment timestamp and the GPS position data and GPS position data from the backend server and display onto the external computing device a map with a path correlating to the GPS position data collected over the GPS position data timestamp;
further wherein a portion of the video segment is retrieved through the GUI and displayed on the external computing device by a user selecting at least a portion of the path correlating to the GPS position data collected over the GPS position data timestamp through the backend server through the camera; and
wherein the portion of the video segment retrieved is a designated preview segment and is recompiled and displayed at a frame rate lower that an initial recorded frame rate.

12. The dashcam system of claim 11 wherein the video segment comprises a plurality of video frames, and each frame comprises a corresponding frame GPS position data point, further wherein the GUI displays each video frame and displays each frame GPS position data point on the path concurrently such that as each video frame progresses to a subsequent video frame, each subsequent GPS position data point is progressed along the path.

13. The dashcam system of claim 11 wherein the camera is communicatively coupled to the backend server through at least one of: a cellular radio, a Bluetooth radio, a Wi-Fi radio, an NFC radio, or a LoRa radio.

14. The dashcam system of claim 11 wherein the path changes from a first color to a second color as a portion of the path is selected.

15. A dashcam system comprising:
- a camera comprising a video capture device, memory, wherein the camera is communicatively coupled to a GPS positioning device and communicatively coupled to a backend cloud server;
- the backend cloud server including a software database and a frontend graphical user interface (GUI) communicatively coupled to the camera and an external computing device;
- wherein the camera is configured to record a video segment and collect GPS position data from the GPS positioning device, collect and synchronize a video segment timestamp and a GPS position data timestamp, and store a video segment synchronized with the GPS position data, video segment timestamp and a GPS position data timestamp in the memory or transmitted to the backend server;
- further wherein the camera is configured to transmit the video segment timestamp and the GPS position data and GPS position data timestamp to the backend cloud server;
- further wherein the GUI is configured to pull the video segment timestamp and the GPS position data and GPS position data from the backend server and display onto the external computing device a map with a path correlating to the GPS position data collected over the GPS position data timestamp; and
- further wherein the GUI is configured to play a video segment portion and display a progression of the each GPS position data point on the path concurrently with the progression of the video segment.

16. The dashcam system of claim 15 wherein the video segment comprises a plurality of video frames, and each frame comprises a corresponding frame GPS position data point.

17. The dashcam system of claim 15 wherein the portion of the video segment retrieved is a designated preview segment and is recompiled and displayed at a frame rate lower that an initial recorded frame rate.

* * * * *